March 29, 1927. 1,622,667
T. C. PHALIN
COMBINATION BUMPER AND FENDER
Filed Oct. 26, 1926 2 Sheets-Sheet 1
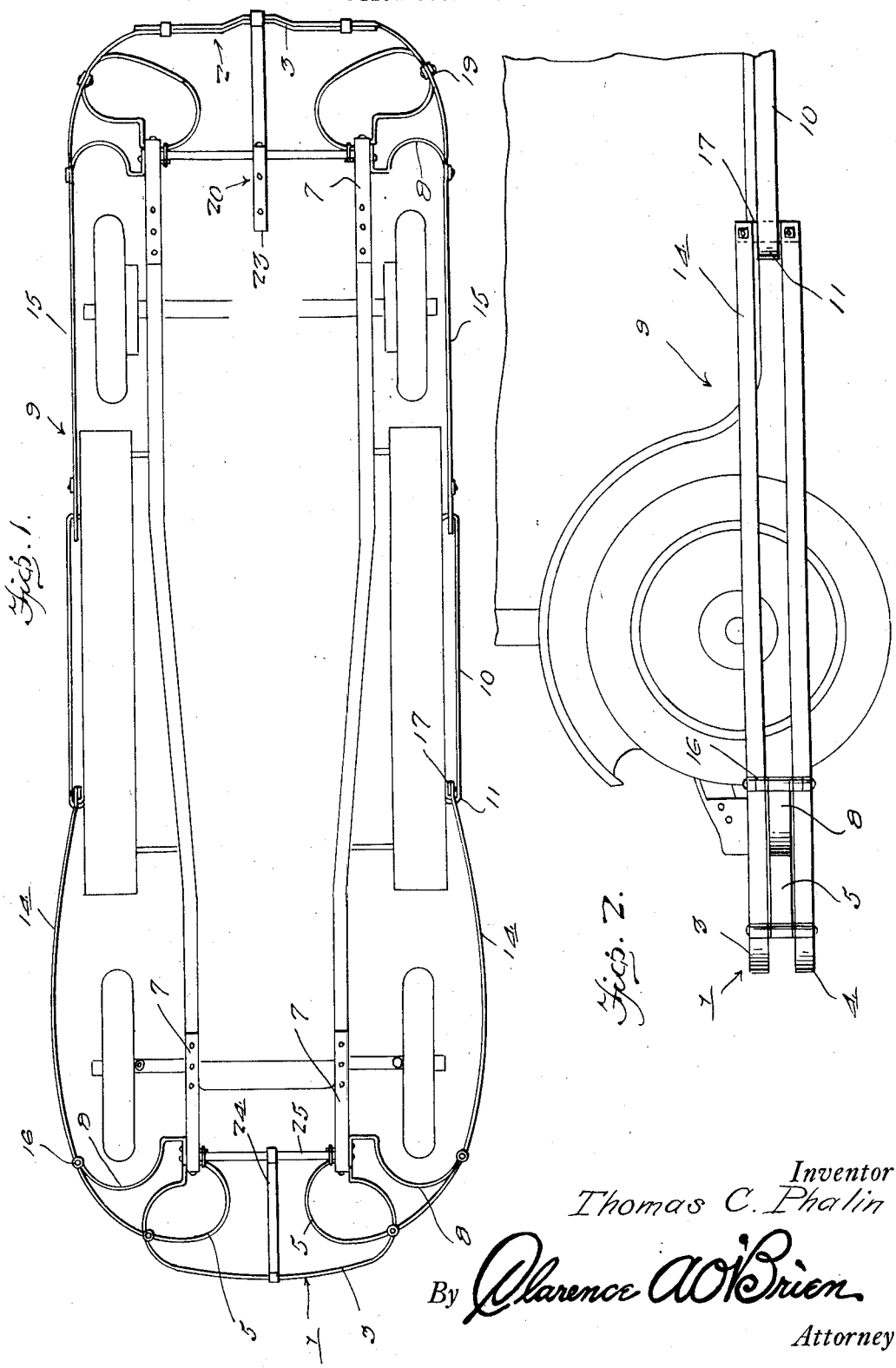
Inventor
Thomas C. Phalin
By Clarence A. O'Brien
Attorney

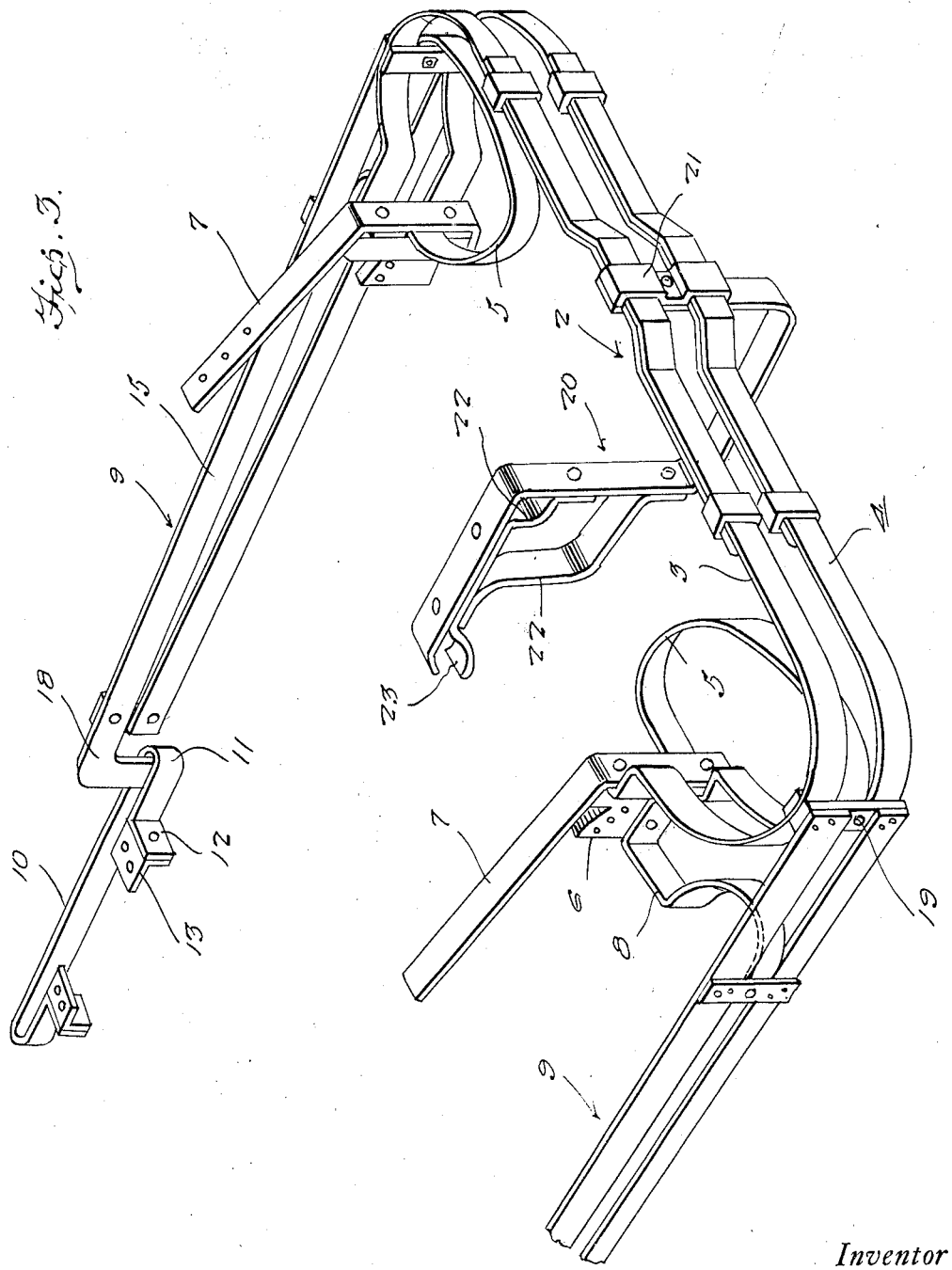

Patented Mar. 29, 1927.

1,622,667

UNITED STATES PATENT OFFICE.

THOMAS C. PHALIN, OF CONNELLSVILLE, PENNSYLVANIA.

COMBINATION BUMPER AND FENDER.

Application filed October 26, 1926. Serial No. 144,285.

This invention relates to a combined bumper and fender for use on automobiles, and it has more particular reference to a structure of this kind which includes bumpers for the front and rear ends of the automobile, together with complemental sideguards cooperating to provide side fenders, the structure completely surrounding the automobile to provide a more efficient guard against collisions and accidents.

The particular structural details and advantages derived therefrom will become more readily apparent from the following description and drawings.

In the accompanying drawings:—

Figure 1 is a top plan view of the complete structure showing the approximate manner in which it is associated with the automobile.

Fig. 2 is a fragmentary side elevation, on an enlarged scale, looking at the forward portion of the structure.

Fig. 3 is a perspective view of the rear half of the structure.

Referring to the drawings in detail, it will be seen that there are bumpers at opposite ends of the vehicle, the forward bumper being indicated generally by the reference character 1 and the rear bumper by the reference character 2. Each bumper is composed of a main section which is in turn composed of upper and lower spaced metal strips 3 and 4. In connection with the rear bumper 2, it will be seen that this is of double-ply construction. The end portions of the strips in each instance are bowed in a somewhat conventional manner and attached to the chassis bars of the automobile.

Associated with the end portions of each of the main bumper sections are supplemental bumper sections or cushioning elements 5. These are disposed on a plane to permit portions thereof to be arranged between the upper and lower strips 3 and 4 of the main bumper sections. Both the main and supplemental bumper sections are connected to attaching members 6 which are fastened in any appropriate manner to the chassis bars of the vehicle frames. In addition, attaching straps 7 are employed for maintaining the bumpers in place.

Moreover, spacers 8 are connected at their inner ends to the attaching devices 6 and at their outer ends to the side guards 9. Before entering a specific description of the side guard or fender construction, I would call attention to Fig. 3, wherein it will be seen that special keepers are employed upon the running board of the vehicle for cooperation with the side guard. Each keeper comprises a strip of metal 10 having its opposite ends bent upon themselves as at 11 and terminating in inwardly directed extremities 12 carrying attaching brackets 13 fastened to the under side of the running board.

The side fenders are composed of rear sections and front sections 14 and 15 respectively. The forward sections are hingedly connected as at 16 to the front bumper construction and are adapted to swing outwardly away from the front wheels in order to permit access to be had to the tires and the wheel. These swingably mounted sections are composed of spaced parallel strips connected to a cross piece 17 at their rear ends, and this cross piece is located in the adjacent bend of the aforesaid keeper in the manner shown. The cross piece is fastened by bolts which, when removed, allow the forward sections 14 to be swung outwardly upon their pivots.

The rear sections 15 are likewise composed of spaced strips or bar members connected together and one of the bar members has a downturned end as at 18 in Fig. 3, cooperating with the keeper as shown in order to maintain the same in place. It will be noticed from this figure that the rear fender sections are mounted to swing upwardly on a horizontal pivot as at 19.

While considering Fig. 3, I would direct attention to a special bracket 20, which is coupled as at 21 to the central portion of the rear bumper. This bracket includes an upstanding part of right-angular formation carrying suitable braces 22 and having a clamp 23 adapted to be connected with one of the bars of a trunk rack (not shown). If desirable, a suitable tie connection 24 may be employed between the central portion of the front bumper 1 and the transverse cross piece 25 of the automobile chassis, as represented in Fig. 1.

It is believed that by considering the description in connection with the drawings, a clear understanding of the construction and use of the invention will be had. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:—

1. In a structure of the class described, front and rear bumpers including main and supplemental sections, means for attaching said bumpers to an automobile chassis, keepers adapted to be connected with the running boards of the automobile, and swingably mounted side fenders connected with the respective bumpers, and cooperable at their inner ends with said keepers.

2. In a structure of the class described, front and rear bumpers composed of main and supplemental sections, means for attaching the bumpers in their entirety to an automobile chassis, a pair of duplicate keepers adapted to be connected to the running boards of the automobile, each keeper comprising a strap of metal having its opposite ends bent inwardly towards each other, angle brackets for connecting the straps with the running boards, and two pairs of side fenders, the outer ends of the fenders being pivotally connected with the front and rear bumpers respectively, the inner ends of the side fenders being constructed to permit them to be detachably connected with the bent end portions of the straps of said keepers.

3. In a structure of the class described, a rear bumper made up of a main section and a pair of supplemental sections, the main section comprising upper and lower spaced bars, the supplemental sections comprising yieldable strips located on a plane to dispose them substantially on a line in alinement with the space between said upper and lower bars, attaching means for the end portions of the bumper, spacers associated with the end portions, and a special bracing and attaching bracket connected with the intermediate portion of the bumper and provided with clamps whereby it may be connected with parts of the automobile.

4. In a structure of the class described, a rear bumper made up of a main section and a pair of supplemental sections, the main section comprising upper and lower spaced bars, the supplemental sections comprising yieldable strips located on a plane to dispose them substantially on a line in alinement with the space between said upper and lower bars, attaching means for the end portions of the bumper, spacers associated with the end portions, and a special bracing and attaching bracket connected with the intermediate portion of the bumper and provided with clamps whereby it may be connected with parts of the automobile, a pair of side fenders connected by horizontal pivots at their outer end to the end portions of said sections.

5. In a structure of the class described, a rear bumper made up of a main section and a pair of supplemental sections, the main section comprising upper and lower spaced bars, the supplemental sections comprising yieldable strips located on a plane to dispose them substantially on a line in alinement with the space between said upper and lower bars, attaching means for the end portions of the bumper, spacers associated with the end portions, and a special bracing and attaching bracket connected with the intermediate portion of the bumper and provided with clamps whereby it may be connected with parts of the automobile, and a pair of side fenders connected by hinges to the end portions of the supplemental sections.

In testimony whereof I affix my signature.

THOMAS C. PHALIN.